United States Patent [19]

Sharp

[11] Patent Number: 5,412,016

[45] Date of Patent: May 2, 1995

[54] PROCESS FOR MAKING POLYMERIC INORGANIC-ORGANIC COMPOSITIONS

[75] Inventor: Kenneth G. Sharp, Landenberg, Pa.

[73] Assignee: E. I. du Pont de Nemours and Company, Wilmington, Del.

[21] Appl. No.: 119,523

[22] Filed: Sep. 14, 1993

Related U.S. Application Data

[63] Continuation-in-part of Ser. No. 952,128, Sep. 28, 1992, abandoned.

[51] Int. Cl.⁶ .................... C08J 3/24; C08J 3/21; C08K 3/18; C08K 3/34
[52] U.S. Cl. .................... 524/430; 524/431; 524/442; 525/61; 525/431; 525/100; 525/330.3; 525/329.7; 525/903; 525/389; 525/326.2; 525/331.5; 525/342; 525/446; 528/39
[58] Field of Search .............. 525/61, 431, 100, 330.3, 525/329.7, 903, 389, 326.2, 331.5, 342, 446; 528/39; 524/430, 431, 442

[56] References Cited

U.S. PATENT DOCUMENTS

| | | | |
|---|---|---|---|
| 3,624,014 | 11/1971 | Moore | 528/39 |
| 4,214,057 | 7/1980 | Ishihara et al. | 525/100 |
| 4,224,211 | 9/1980 | Kanazawa et al. | 260/31.2 R |
| 5,010,128 | 4/1991 | Coltrain et al. | 524/405 |
| 5,115,023 | 5/1992 | Basil et al. | 525/103 |
| 5,190,698 | 3/1993 | Coltrain et al. | 252/518 |
| 5,286,815 | 2/1994 | Leir et al. | 525/477 |

FOREIGN PATENT DOCUMENTS

| | | | |
|---|---|---|---|
| 1186099 | 4/1985 | Canada . | |
| 0137286 | 4/1985 | European Pat. Off. | C08F 8/42 |
| 707393 | 5/1941 | Germany | 39 b/22 k |
| 2058750 | 4/1981 | United Kingdom | C07C 49/92 |

OTHER PUBLICATIONS

Sumio Sakka, Hiromitsu Kozuka and Sae-Hun Kim, Various Factors Affecting the Conversion of Silicon Alkoxide Solutions to Gels, *Ultrastructure Processing of Advanced Ceramics*, pp. 159–171, 1988.

Bradley K. Coltrain, Sharon M. Melpolder and John M. Salva, Effect of Hydrogen Ion Concentration on Gelation of Tetrafunctional Silicate Sol-Gel Systems, *Ultrastructure Processing of Advanced Materials*, pp. 69–76, 1992.

Derwent Publications Ltd., London, GB;AN92-304145 & JP,A, 4 209 606 (31 Jul. 1992).

*Primary Examiner*—John C. Bleutge
*Assistant Examiner*—Margaret W. Glass

[57] ABSTRACT

Polymeric inorganic-organic compositions are obtained by intimately mixing a hydrolyzable precursor of an inorganic gel of silicon, titanium, or zirconium with an organic polymer and with an organic carboxylic acid having a $pK_a$ value of at most 4.0, present in an amount of at least 2 moles per mole of inorganic component, under conditions such that a homogeneous solution of all three components is initially formed, agitating the solution at 0°–100° C. until gelation of the inorganic component occurs, and recovering the inorganic-organic composition. Water need not be present as an initial reactant. Such compositions often are transparent, always have improved toughness, as compared with inorganic gels alone, and are believed to have a structure in which the organic polymer is entrapped in the inorganic gel in such an intimate manner that these two components cannot be separated from each other by physical means without destruction of the organic polymer.

8 Claims, 4 Drawing Sheets

PROCESS FOR MAKING POLYMERIC INORGANIC-ORGANIC COMPOSITIONS

CROSS-REFERENCE TO APPLICATION

This is a continuation-in-part of my application Ser. No. 07/952,128, filed Sep. 28, 1992, now abandoned.

BACKGROUND OF THE INVENTION

This invention concerns a process for making certain polymeric inorganic-organic compositions, occasionally also referred to herein as hybrid compositions or hybrid materials, which consist essentially of an inorganic network portion and an organic polymer portion, those two components being intimately combined to the point that they cannot be readily separated from each other by known physical processes without substantial destruction of one of those components.

It is well known to make gels of certain inorganic materials, e.g., of silica, by hydrolysis of the corresponding alkoxy compounds. For example, tetraalkoxysilanes are hydrolyzed to a material having

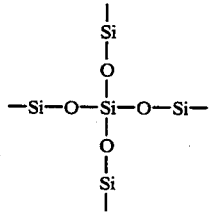

groups. Such reactions require cosolvents for the water and the tetraalkoxysilane and are catalyzed by either acids or alkalies. It has recently been discovered, however, that strong carboxylic acids, especially, e.g., formic acid, can rapidly react with tetraalkoxysilanes to form inorganic networks without the need for either cosolvents or water as a reactant. The acid is not simply a catalyst; it must be present in at least a stoichiometric amount.

It is known to blend organic polymers with inorganic fillers either in order to improve some properties of those polymers or to reduce the cost of the polymeric compositions by substituting cheaper inorganic materials for more expensive organic materials. Typical inorganic fillers can be either particulate or fibrous and can be derived from a variety of materials, including naturally occurring minerals and glass. In most cases, the inorganic filler is discontinuous and can be separated from the polymer matrix by simple mechanical processes or by extraction of the polymer component therefrom. Addition of fillers to organic polymers frequently has the undesirable effect of reducing toughness.

It is believed that certain properties of polymers could be significantly improved, and new properties could be imparted to polymers by providing hybrid inroganic-organic polymer compositions comprising continuous inorganic networks, as described above. Some such compositions are described, for example, in the application Ser. No. 07/725,169 of I. David, now abandoned. However, since David's process requires substantial water solubility of the polymer component, there still is a need for a practical process for making such hybrid compositions.

SUMMARY OF THE INVENTION

According to the present invention, there is now provided a process for making an inorganic-organic composition consisting essentially of an intimate combination of an inorganic network component and an organic polymer component, said process comprising the following sequential steps:

(1) intimately mixing together the following components A) through C) under such conditions that a homogenous liquid solution is initially formed:

A) at least one inorganic network precursor selected from the group of compounds consisting of
tetraalkoxysilanes $Si(OR^1)_4$, tetraalkyl titanates $Ti(OR^2)_4$, tetraalkyl zirconates $Zr(OR^3)_4$, chelated tetraalkyl titanates $Ti^a(OR^4)_n X^d_p$, and chelated tetraalkyl zirconates $Zr^a(OR^5)_n X^d_p$, wherein each one of $R^1$, $R^2$, $R^3$, $R^4$, and $R^5$ independently is a $C_1$-$C_6$ alkyl;

X is a chelating ligand;

a is titanium and zirconium coordination number, being in each case an integer having a value of 4–6;

d is a number, either 2 or 3, corresponding to the chelating ability of the ligand X, d being 2 for a bidentate ligand and 3 for a tridentate ligand;

p is either 1 or 2, except that for d=3, p always is 1; and $n = a - d \cdot p$;

B) at least one organic polymer selected from the group consisting of modified cellulose derivatives, starch, polyamides, polyesters, polymethacrylates and polyacrylates, polyvinyl alcohol, copolymers of vinyl alcohol with ethylenically unsaturated monomers, polyvinyl acetate, poly(alkylene oxides), vinyl chloride homopolymers and copolymers, terpolymers of ethylene with carbon monoxide and with an acrylic ester or vinyl monomer, polysiloxanes, polyfluoroalkylenes, poly(fluoroalkyl vinyl ethers), homopolymers and copolymers of halodioxoles and substituted halodioxoles, and poly(vinylpyrrolidone); and C) an organic carboxylic acid having a $pK_a$ value of at most 4.0, which organic acid may contain up to about 40 mole % of water, and being selected from the group consisting of (i) acids miscible with components A) and (ii) acids miscible with liquids in which components A) are soluble, said acid being present in an amount of at least 2 moles per mole of all components A) present;

the total amount of water present in the reaction medium being less than that of component C) and, further, such that the mole ratio of water to all components A) present is 0 to 20;

(2) maintaining the above solution, with agitation as needed, at a temperature of about 0°–100° C., until gelation of the inorganic component occurs; and (3) recovering the resulting inorganic-organic composition.

BRIEF DESCRIPTION OF THE DRAWINGS

FIG. 3b is an electron micrograph of an unstained sample of the hybrid material shown in FIG. 3a.

DETAILED DESCRIPTION OF THE INVENTION

Figure 1:
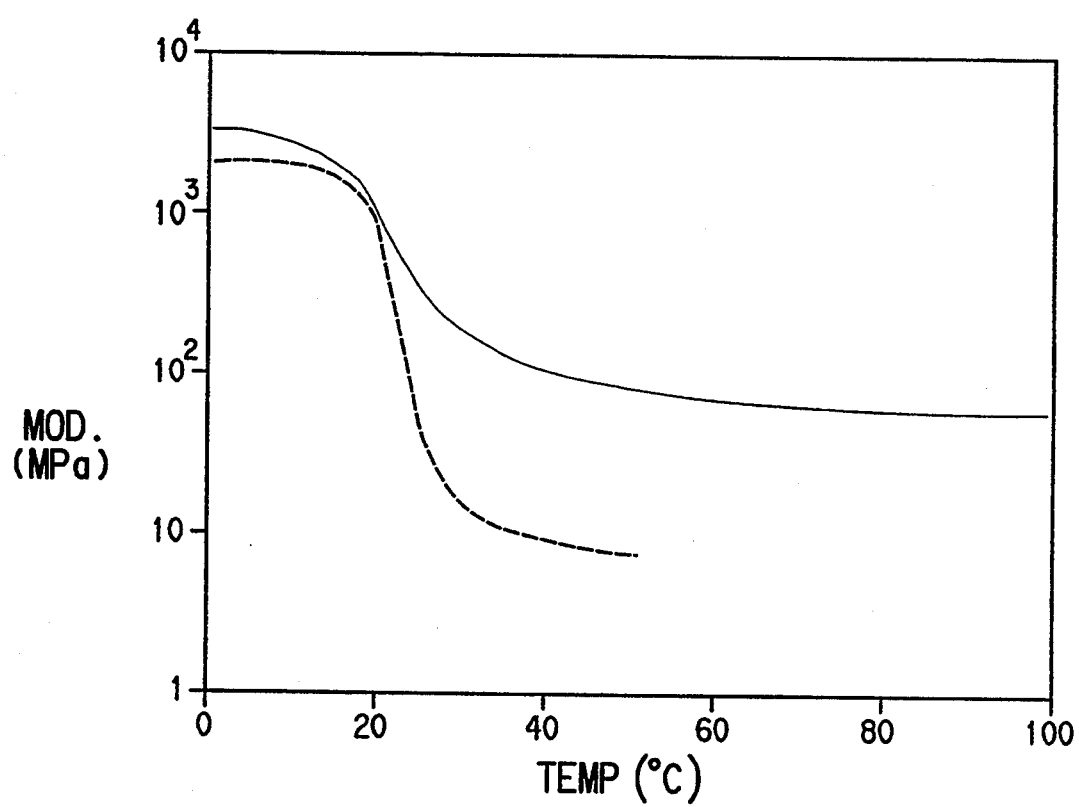
FIG. 1 is a plot of tensile moduli of a hybrid material made by the process of the present invention and of the corresponding organic polymer alone vs. temperature, obtained by dynamic mechanical analysis.

Suitable silicon, titanium, and zirconium compounds that can be used as the starting materials according to this invention include, e.g., tetramethoxysilane, tetraethoxysilane, tetraisopropoxysilane, tetrabutoxysilane, tetra(2-methylpentoxy)silane, tetraethyl titanate or zirconate, tetrapropyl titanate or zirconate, tetrabutyl titanate or zirconate, and titanium or zirconium tetraisopropoxide-2,4-pentanedionate.

Suitable representative organic polymers include, for example, poly(hexamethylene adipamide), poly(ε-caprolactam), poly(hexamethylene phthalamide or isophthalamide), poly(ethylene terephthalate), poly(butylene terephthalate), ethylcellulose and methylcellulose, poly(vinyl alcohol), ethylene/vinyl alcohol copolymers, tetrafluoroethylene/vinyl alcohol copolymers, poly(vinyl acetate), partially hydrolyzed poly(vinyl acetate), poly(methyl methacrylate), poly(ethyl methacrylate), poly(ethyl acrylate), poly(methyl acrylate), ethylene/carbon monoxide/vinyl acetate terpolymers, ethylene/carbon monoxide/methyl methacrylate terpolymers, ethylene/carbon monoxide/n-butyl acrylate terpolymers, poly(dimethylsiloxane), poly(phenylmethylsiloxane), poly(heptafluoropropyl vinyl ether), homopolymers and copolymers of perfluoro(1,3-dioxole) and of perfluoro(2,2-dimethyl-1,3-dioxole), especially with tetrafluoroethylene and optionally with another ethylenically unsaturated comonomer, poly(ethylene oxide), poly(propylene oxide), and poly(tetramethylene oxide).

Suitable organic carboxylic acids include, for example, formic acid; all bromoacetic, chloroacetic, and fluoroacetic acids; α-chloropropionic acid; o-fluorobenzoic acid; hydroxyacetic (glycolic) acid; lactic acid; salicylic acid, and tartaric acid. The organic acid enables both hydrolysis and condensation reactions, which lead to gelation of the inorganic component A). The overall reaction between the inorganic component such as, for example, tetraalkoxysilane, with the organic acid (for example, formic acid) involves intermediate steps but can be illustrated by the following equation:

$$Si(OR)_4 + 2HCOOH = SiO_2 + 2ROH + 2HCOOR.$$

This explains the requirement of at least 2 moles of acid per mole of inorganic component.

Formic acid is normally commercially available in an aqueous solution. This can be an 80% (w/w) solution, containing 20% of water, a 90% solution, or a 96% solution. Nearly anhydrous formic acid can be made by dehydrating a commercial 96% solution, for example, by adding acetic anhydride thereto until all or nearly all the water present therein has been used up. Some other organic acids of interest will have lower miscibilities with water or will be completely immiscible therewith. Such other organic acid can be dissolved in organic solvents, either polar or nonpolar. Polar organic solvents include, for example, methanol, ethanol, acetone, methyl ethyl ketone, tetrahydrofuran, dioxane, acetic acid, acetonitrile, and dimethyl sulfoxide. Nonpolar organic solvents include, for example, aliphatic and aromatic liquid hydrocarbons and halogenated hydrocarbons such as, for example, hexane, cyclohexane, benzene, toluene, dibromomethane, tetrachloroethane, chlorobenzene, and o-dichlorobenzene.

It has to be kept in mind that polymers containing hydroxyl groups such as, for example, poly(vinyl alcohol) or ethylene/vinyl alcohol copolymers undergo in the process of this invention substantial esterification of those hydroxyl groups by the organic acid. Thus, when poly(vinyl alcohol) is dissolved in formic acid, it will be substantially esterified to poly(vinyl formate). It is important to note that, under the process conditions of the present invention, no transesterification of the inorganic component (such as, e.g., tetraalkoxysilane) with polymer hydroxyl groups can be detected. Thus, even in the presence of hydroxyl group-carrying polymers, Si—O—Si bonds are formed but not Si—O—C bonds. Gelation thus is attributable to hydrolysis or acidolysis of the inorganic component but not to a reaction of the inorganic component with the organic polymer.

Generally speaking, when the three basic components used in the process of the present invention cannot be mixed together to form a homogeneous solution, either because one or more of the components are solid and insoluble in any liquid present or because two or more liquid phases present are not miscible with one another, the desired homogenous solution usually can be obtained either by adding one or more solvents to the mixture or by initially using one or more solutions of the required components, rather than neat components. As a practical matter, most polymers of interest are solid at room temperature and therefore would have to be used either at an elevated temperature or in solution. In each case, a good solvent for the polymer, miscible with the other liquids, would have to be selected. Many of the above-listed solvents for carboxylic acids also are good solvents for some polymers. Other solvents, specifically useful for particular polymers, may be used as well. One skilled in the art will be able to select a solvent system operable for any combination of inorganic gel precursor, organic carboxylic acid, and polymer.

Many of the hybrid compositions made by the process of the present invention have sufficient homogeneity to be transparent in the visible range and thus are suitable in various optical applications in which transparency is important, for example, in goggles, lenses and sighting devices for scientific equipment, industrial monitoring equipment, and sporting goods. Many of those compositions have considerably improved toughness, compared with that of the same organic polymer alone. Of special interest are compositions that can be made by the process of the present invention wherein the organic polymer has a low flexural modulus and a glass transition temperature near or below room temperature in applications where high impact resistance is desired. Further, these compositions have a highly improved resistance to organic liquids, to the point that a polymer which normally would be readily soluble by itself in a given solvent is not extractable from those compositions by the same solvent. Because of that, as well as for other reasons which will become apparent from the examples herein, it is believed that the organic polymer and the inorganic gel form interpenetrating networks or, at least, that the polymer molecules penetrate the inorganic gel network. Other properties that are either imparted to the polymer or improved are, among others, resistance to viscous flow, resistance to abrasion and thermal stability and/or heat distortion temperature. Optically transparent and/or low dielectric constant materials of the present invention can find use in applications where lower modulus glass, compared with ordinary glass, is desired; for example, as interlayer dielectric materials in electronic applications. Other hybrid materials made by the process of the present invention are useful in the same type of applications as the corresponding organic polymers, for example, as engineering resins or molding resins, except that they will be higher performance materials than the parent polymers and thus will be suitable for applications that must meet more rigorous strength, thermal stability, or heat distortion temperature standards.

This invention is now illustrated by examples of certain representative embodiments thereof, where all parts, proportions, and percentages are by weight unless otherwise indicated. All units of weight and measure not originally obtained in SI units have been converted to SI units. Silica content was calculated assuming complete conversion of the alkoxysilane precursor into networked Si—O moieties. However, in selected experiments, the hybrid material was heated to the point of decomposition of the polymer, and the inorganic residue was determined gravimetrically. The experimentally obtained silica content values were consistent with the calculated values.

EXAMPLE 1

Tetraethoxysilane, 3.156 g, was added to 6.083 g of 96% aqueous formic acid with gentle stirring so as to give a homogeneous solution. To this solution was added 48.901 g of a 10.09% solution of poly(vinyl alcohol) (Elvanol ® 51-05 of E. I. du Pont de Nemours and Company) in 96% aqueous formic acid. The polymer initially had 15 mole % acetate and 85 mole % alcohol groups and a number average molecular weight of approximately 24,000. Continuous films were cast from the above solution by using a doctor blade to spread a uniform liquid layer of a 500 μm thickness on a sheet of polypropylene. The liquid layer gelled within a few minutes on exposure to the atmosphere at room temperature and was allowed to dry for one hour under those conditions. The sample could then be easily removed from the substrate as a continuous, transparent film of a thickness of approximately 58 μm. The hybrid material was calculated to contain 84.5% of polymer and 15.5% of silica, based on complete conversion of the starting tetraethoxysilane to silica. The film was cut into 12.5×50 mm strips, which were dried for 3.5 hours at a temperature of 100° C. and a pressure of 20 kPa, then subjected to uniaxial stress/strain measurements according to ASTM D-638. The film had a tensile modulus of 3.55 GPa; breaking stress of 59.3 MPa; and elongation at break of 84%.

EXAMPLE 2 (COMPARATIVE)

A 10.7% solution of the same poly(vinyl alcohol) in 96% formic acid was poured into a poly(methylpentene) dish and allowed to dry to form a film having a thickness of approximately 58 μm. The film was vacuum-dried and subjected to the same stress/strain measurements as the film of Example 1. The film has a tensile modulus of 0.44 GPa, breaking stress of 4.83 MPa, and elongation at break of 356%.

EXAMPLE 3

A hybrid material was made by the method of Example 1 from tetraethoxysilane and a commercial copolymer of ethylene with vinyl alcohol containing 30% ethylene, number average molecular weight 25,000–30,000, fully hydrolyzed. The hybrid composition consisted of 78.3% polymer and 21.7% silica. The homogeneous solution in 96% formic acid was cast into a polystyrene dish, which was loosely covered and allowed to air-dry. When dry, the film was transparent and flexible and had a thickness of about 100 μm. The solution was also used to coat glass slides via dip coating at a withdrawal rate of 2–3 cm/min. These coatings were very smooth and showed excellent adhesion to the glass.

A strip of film was subjected to dynamic mechanical analysis over the temperature range of −100° C. to 100° C. according to ASTM method D 5026-89. A comparison sample was prepared from the copolymer itself recovered from a solution in 96% formic acid. FIG. 1 is a plot of tensile modulus vs. temperature. The upper curve is that obtained for the hybrid, while the lower curve is that for the organic polymer. As can be seen from the figure, the data indicate a much higher modulus (about a factor of 10) for the hybrid vis-à-vis the parent polymer near and above the glass transition temperature. The glass transition temperature can be taken as the region of most rapid decline of the modulus; FIG. 1 indicates this to be in the vicinity of 22° C. The data also indicate a much higher use temperature for the hybrid; the pure polymer loses all strength (shows viscous flow behavior) in the vicinity of 50° C., whereas the hybrid material is intact at 100° C., the high temperature limit of the experiment.

EXAMPLE 4

A hybrid material was made by the method of Example 1 from tetraethoxysilane and nylon 66 (Zytel ® 101, DU PONT, with a number average molecular weight of about 23,000). The homogeneous solution was poured into a 5 ml fluoropolymer vial equipped with a loosely fitting lid. The solution formed a clear gel after standing at room temperature for 35 minutes. The gel was allowed to dry slowly over a period of several weeks to form a clear monolithic structure. Assuming complete conversion of tetraethoxysilane to silica, the material was calculated to be 87.5% silica, 12.5% polymer. Analysis by differential scanning calorimetry and birefringence measurements indicated that the originally crystalline polyamide became amorphous in the hybrid.

EXAMPLE 5

A hybrid material was made by the method of Example 1 from tetraethoxysilane and nylon 66 with a calculated solids content of 45.4% silica, 54.6% polymer. The translucent gel was dried slowly to give a translucent solid which contained some crystalline polymer. Thermal gravimetric analysis (TGA) of this specimen gave the maximum thermal decomposition rate, as assessed by the first derivative of weight loss vs. time, of 4.9% per minute. The TGA indicated the inorganic content of the material to be approximately 44%. The same nylon 66 cast from a solution in 96% formic acid had a maximum thermal decomposition rate of 27.0% per minute.

EXAMPLE 6

Poly(methyl methacrylate) synthesized via group-transfer polymerization, having a number average molecular weight of about 105,000, was dissolved in a formic/acetic acid mixture prepared by adding acetic anhydride to 96% aqueous formic acid and containing about 65 mole % of formic acid, 0.4 mole % of water, and 34.6 mole % of acetic acid. This method of drying aqueous formic acid is practical for reducing the water content to less than 1 mole %. A hybrid material was made by adding successively larger amounts of this solution to a solution of tetraethoxysilane in 96% formic acid. After each addition, glass microscope slides were dip-coated with the hybrid material by inserting a slide into the solution and withdrawing at the rate of 2-3 cm/min. The compositional range covered was 30.0 to 88.7% silica. Coatings of all compositions were clear, transparent, colorless, and smooth, both as applied and when fully dried.

EXAMPLE 7

A hybrid material was made by the method of Example 1 from tetraethoxysilane and poly(vinyl alcohol) so as to provide a composition containing 30.7% of silica. Flexible films of 50 or 125 $\mu$m thickness were prepared with doctor blades in the manner of Example 1 and air-dried. The hybrid films were submerged in acetonitrile for one week at room temperature without a dissolution or other deleterious effect. By comparison, a film made from a solution of the same poly(vinyl alcohol) in formic acid dissolved rapidly and completely in acetonitrile at room temperature.

EXAMPLE 8

A hybrid material was made from tetraethoxysilane and poly(vinyl alcohol) by the method of Example 1. It contained 75% of polymer and 25% of silica. A 10-cm diameter circular piece of free-standing film, 42 $\mu$m in thickness, was made by means of a doctor blade and air-drying. Oxygen permeability of this film was determined according to ASTM D3985-81, modified to run at 80% relative humidity (instead of 0%) and at 30° C. (instead of 23° C.). These changes would tend to give a higher permeability value than the ASTM test for the same sample. The oxygen permeability value, after a nine-day exposure to oxygen was approximately 0.003217 $cm^3 \cdot \mu m$(thickness)/$cm^2$(area).kPa. The oxygen permeability value of polyvinyl alcohol film under the same test conditions cannot be determined because the polymer is too soft for testing under the experimental conditions adopted here. The closely related polymer, polyvinyl acetate has an oxygen permeability value of about 0.0583 $cm^3 \cdot \mu m$(thickness)/$cm^2$(area).kPa.

EXAMPLE 9

A hybrid material was formed from tetraethoxysilane and poly(vinyl alcohol) by the method of Example 1, except that the gelled material was allowed to dry slowly to form a bulk, monolithic, cylindrical piece. The hybrid material's composition was 75% polymer and 25% silica. The softening temperature of this material was determined by thermomechanical analysis. This was done by placing a probe tip under a 50 g load on the top face of a cylindrical sample and monitoring the vertical displacement of the probe as a function of the temperature of the sample. No significant softening was observed at temperatures up to 200° C., which was the highest test temperature. The corresponding poly(vinyl formate) softened under the test conditions at or below 20° C.

EXAMPLE 10

A hybrid material was made by adding tetraethoxysilane to a 10% solution in 96% formic acid of the same ethylene copolymer with vinyl alcohol as used in Example 3. The composition of the dissolved materials in the resulting homogeneous solution was 73.3% of silica and 26.7% of polymer. This solution was used to partially dip-coat a 2.5×7.5 cm piece of poly(methyl methacrylate). The coating was clear after air-drying at room temperature. The specimen was then heated in air at 105° C. overnight. Both the coated and uncoated portions of the sample were subsequently abraded with grade 0000 steel wool, which is the finest commercially available grade, under conditions which caused the entire surface of the uncoated poly(methyl methacrylate) piece to be scratched. By contrast, the coated portions showed almost no abrasion by steel wool.

EXAMPLE 11

Hybrid materials containing, respectively, 10% and 30% of silica were made according to the method of Example 1 from tetraethoxysilane and poly(vinyl alcohol). Films, 7-50 $\mu$m thick, were subjected to toughness evaluation by the essential work method described by K. B. Broberg in *Int. J. Fracture*, 4, 11 (1968). The 30% silica film showed a fracture energy (associated with toughness in this test) of 16 mJ/$mm^2$, while the 10% silica film had a fracture energy of only 0.7 mJ/$mm^2$. By comparison, polycarbonate films, which are known to have useful levels of toughness, have a fracture energy of 10.8 to 16.2 mJ/$mm^3$; see P. McGonigal et al., *Proc. 7th Intl. Conf. on Deformation, Yield and Fracture of Polymers*, p. 39 (1988).

EXAMPLE 12

A hybrid material containing 25% of silica was made by the method of Example 1 from tetraethoxysilane and poly(vinyl alcohol). Films made from this material were subjected to dynamic mechanical analysis. Depending on their moisture content, the films had definite glass transition temperatures ranging from about 20° C. to 60° C. Unlike films derived from solutions of poly(vinyl alcohol) in formic acid, none of these hybrid films showed viscous flow near or above its glass transition temperature.

EXAMPLE 13

A hybrid material was made by a reaction of tetraethoxysilane with hexamethylcyclotrisiloxane in a 6.61:1 mole ratio in solution in 96% formic acid. Formic acid had been earlier shown in this laboratory to effect ring-opening polymerization of hexamethylcyclotrisiloxane, as shown in the following equation for the general ring opening polymerization by means of an acid HX:

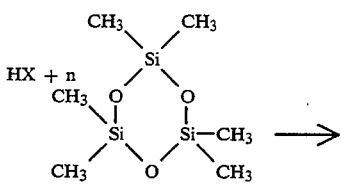

-continued $$H[OSi(CH_3)_2]_{n-1}OSi(CH_3)_2X.$$

The solution was allowed to gel at room temperature to give a translucent material. The gel could be dried at room temperature without cracking to give a white, smooth solid with a hydrophobic surface. Comparable gels made without polymer are wet with water. This example demonstrates the use of a monomeric precursor to the polymer component and the preparation of a hydrophobic hybrid when silica is the major component of the hybrid.

EXAMPLE 14

A hybrid material containing 20% of silica was made by the method of Example 1 from tetraethoxysilane and poly(vinyl alcohol). A 50 μm thick film made with a doctor blade was cut into small pieces which were placed between flat platens with a fluoropolymer liner and compressed at 150° C. and about 2758 kPa pressure. The material formed a clear, smooth, continuous film, which incorporated all the original pieces of the sample.

EXAMPLE 15

A hybrid material film was made by the method of Example 1 from tetraethoxysilane and poly(vinyl alcohol) with a calculated silica content of 20% and a thickness of 55 μm when air dried at room temperature. A 12.5×50 mm piece of the sample was then heated in air for one hour at 140° C. The appearance of the piece was unchanged but it had stiffened due to the densification of the silica network. A uniaxial stress/strain measurement, described in Example 1, indicated a tensile modulus of 4.5 GPa. The tensile strength of this sample was 92 MPa.

EXAMPLE 16

Figure 2:
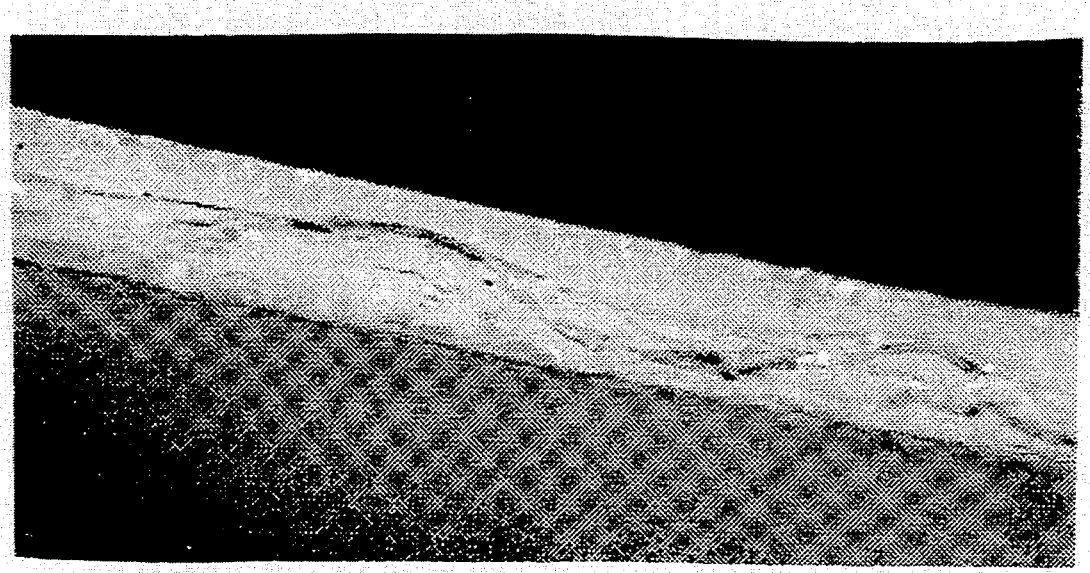
FIG. 2 is a digitized representation of an electron micrograph of a sample of a hybrid material of the present invention.

A hybrid material film was made by the method of Example 1 from tetraethoxysilane and poly(vinyl alcohol) with a calculated silica content of 25% and a thickness of 40 μm when air dried at room temperature. A small piece weighing 0.075 g was cut from the dry film with a sharp knife and heated under nitrogen to 700° C. at a rate of 10° C./min. in a thermogravimetric apparatus. Weight loss was monitored as a function of temperature. At the conclusion of the experiment, the sample had lost 74.3% of its mass because of pyrolysis of its organic component. The sample remained a single continuous mass during the experiment and retained the cut edge. The ultimate temperature to which the sample was exposed is well below the temperature at which individual silica particles could sinter together (see C. Brinker et al., Sol-Gel Science, Academic Press, 1991, Ch. 12). Accordingly, the hybrid sample must have contained a continuous network of silica. FIG. 2 is a digitized image of an electron micrograph of an edge of a 40 μm-thick specimen of this material obtained at a 380× magnification. The opposite edge of the specimen was inserted into a piece of modeling clay, so that this assembly of clay with specimen could be readily oriented for viewing. The sample was placed under an optical stereomicroscope in which one of the eyepieces had been replaced by a miniature video camera. The edge of the specimen to be observed was placed in such a manner that the illuminating light struck it directly at an angle of at most a few degrees from the plane of the specimen. The analog video signal was sent to a viewing monitor as well as to an Apple Macintosh ® computer equipped with a circuit board which converted the analog image into a digital "gray scale" image. The digitized image was stored as a graphic file and printed with a laser printer at a resolution of 300 dots per inch (118.1 dots per cm).

FIG. 2 shows a continuous mass of material between two parallel lines, oriented diagonally in this figure, which is attributed to the silica network. This is the end view of the edge of the specimen. A few white specks which can be seen on the edge surface are attributed to dust since this observation was not conducted in a clean-room environment. Finally, the dark, wavy line running throughout the length of the edge is believed to be a fracture or mechanical damage caused by cutting the sample with an ordinary laboratory knife.

EXAMPLE 17

Hybrid materials were made by the method of Example 1 from tetraethoxysilane and poly(methyl methacrylate) with calculated silica contents of 25% and 50%, respectively. The samples were placed in cylindrical polyethylene containers. They were then dried to cylindrical monolithic solids by exposure to the atmosphere through apertures created in both ends of the containers. The dried hybrids, in the form of right cylinders several mm in height, were then subjected to a thermomechanical test. During the test, a stylus was placed on the top surface of the specimen and placed under a load of 50 g; its vertical displacement was monitored as a function of temperature. This is a well established test for heat-induced softening behavior. A comparable test was conducted with a specimen of pure poly(methyl methacrylate) of comparable size. At a temperature of 200° C., the percent deformation, for the three samples, calculated as percent of the original height of each sample, was as shown in the Table below.

TABLE

| Silica content, % | Deformation, % at 200° C. |
|---|---|
| 0.0 | 22.1 |
| 26.1 | 4.7 |
| 50.9 | 1.1 |

EXAMPLE 18

Creep Behavior

A hybrid material film was made by the method of Example 1 from tetraethoxysilane and poly(vinyl alcohol) with a calculated silica content of 5% and a thickness of 52 μm when air dried at room temperature. A 5.75 mm long strip of the sample was fixed at one end and suspended vertically; then the free end was subjected to a downward load of 0.67N at 25° C., and the sample extension with time monitored for 16 hours. At the conclusion of the experiment, the extent of sample creep was 0.76% of its original length.

EXAMPLE 19

Comparative Creep Behavior

A film was made by the method of Example 2 from poly(vinyl alcohol) dissolved in 96% formic acid. The film had a thickness of 100 μm when air dried at room temperature. A creep measurement by the method of Ex. 18 was attempted for this sample. However, when placed under the same load of 0.67N at 25° C. as the hybrid sample, the pure polymer sample very rapidly extended to approximately 300% of its original length, well beyond the measurement limits of the instrument.

EXAMPLE 20

A film was made by the method of Example 1 from tetraethoxysilane and poly(vinyl alcohol) dissolved in 96% formic acid with a calculated silica content of 25%. The film had a thickness of 100 μm when air dried at room temperature. The dried film was microtomed at low temperature to yield a 100 nm-thick cross-sectional piece. This sample was then exposed to a solution of 1% phosphotungstic acid in methanol for 72 hours. A comparable cross-sectional piece was left unstained. Phosphotungstic acid is utilized as a stain in electronic microscopy because of its ability to attach the highly dense tungsten atom to organic molecules or polymers and thus to provide high contrast between the phases. In a separate experiment, this reagent was shown to have no effect on pure silica gel during a 72 hours exposure. The pure polymer recovered from a solution of poly(vinyl alcohol) in 96% formic acid was stained by phosphotungstic acid but also dissolved in the solvent before the end of the soaking period.

Figure 3A:
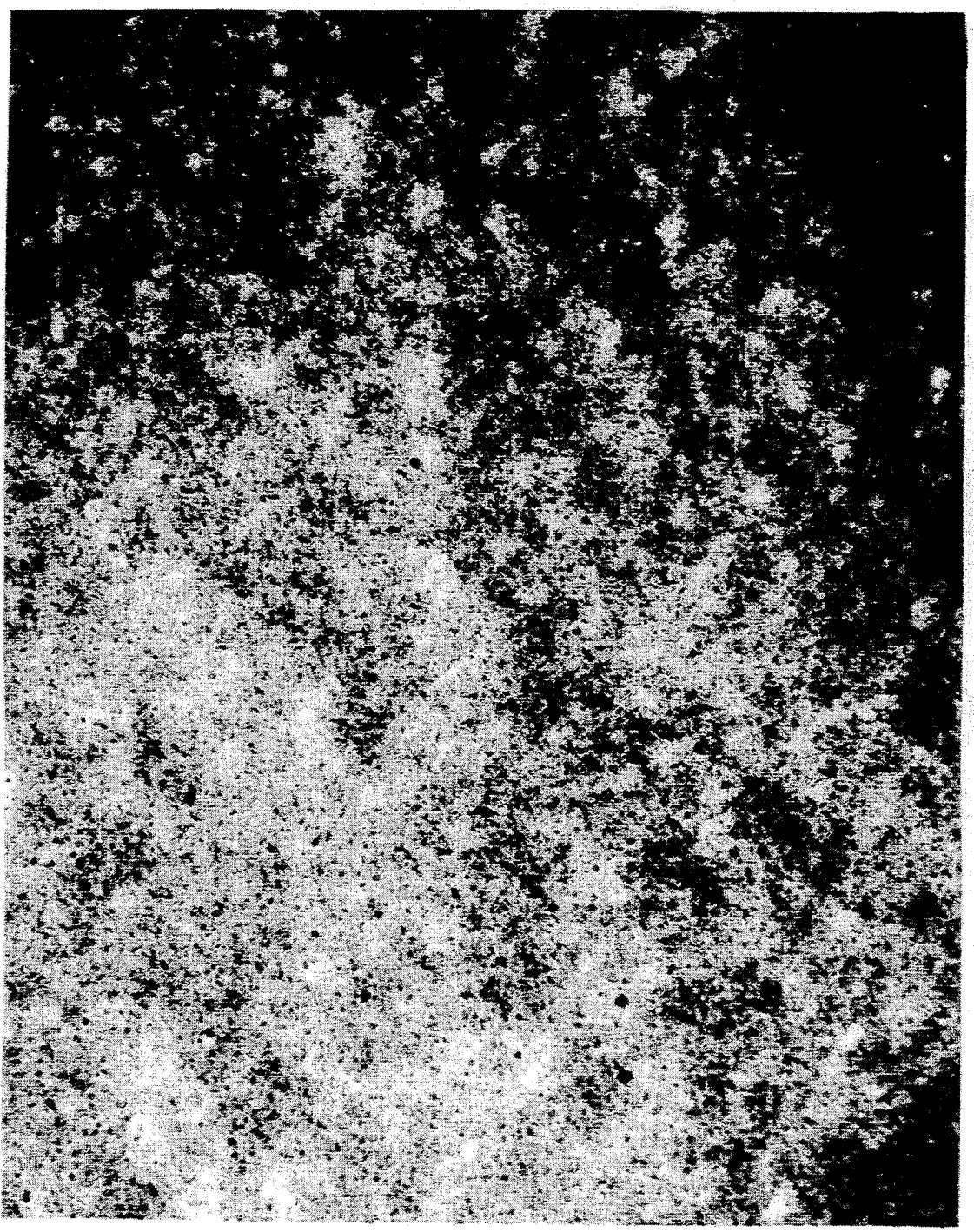
FIG. 3a is an electron micrograph of a stained sample of another hybrid material of the present invention.
Figure 3B:

The stained hybrid specimen and comparable cross-sectional piece which had not been stained were examined by transmission electron microscopy. FIG. 3a is an electron micrograph of the stained sample. FIG. 3b is an electron micrograph of the unstained sample. Dark regions corresponding to stained polymer domains were clearly evident in the stained sample but had no counterpart in the unstained sample. The polymer domain sizes were determined to be 3-15 nm.

EXAMPLE 21

A hybrid material was made by the method of Example 1 from tetraethoxysilane and poly(vinyl alcohol) with a calculated silica content of 5% and a thickness of 62 μm when air-dried at room temperature. A rectangular piece, 12.5×50 mm, of the sample was heated in air for one hour at 140° C. The appearance of the piece was unchanged, but it had stiffened as a result of the densification of the silica network. A uniaxial stress/strain measurement, described in Example 1, indicated a tensile modulus of 1.2 GPa, breaking stress of 22.6 MPa, and elongation at break of 148%. Even at this low level (about 3 volume %) of the inorganic component, the tensile modulus and breaking stress values were much higher for this material than for the poly(vinyl alcohol) itself.

I claim:

1. A process for making an inorganic-organic interpenetrating network composition consisting essentially of an intimate combination of an inorganic gel component and an organic polymer component, said process comprising the following sequential steps:
   (1) intimately mixing together the following components A) through C) under such conditions that a homogenous liquid solution is initially formed:
      A) at least one inorganic gel precursor selected from the group of compounds consisting of tetraalkoxysilanes $Si(OR^1)_4$, tetraalkyl titanates $Ti(OR^2)_4$, tetraalkyl zirconates $Zr(OR^3)_4$, chelated tetraalkyl titanates $Ti^a(OR^4)_n X^d_p$, and chelated tetraalkyl zirconates $Zr^a(OR^5)_n X^d_p$, wherein
      each one of $R^1$, $R^2$, $R^3$, $R^4$, and $R^5$ independently is a $C_1$-$C_6$ alkyl;
      X is a chelating ligand;
      a is titanium and zirconium coordination number, being in each case an integer having a value of 4-6;
      d is a number, either 2 or 3, corresponding to the chelating ability of the ligand X, d being 2 for a bidentate ligand and 3 for a tridentate ligand;
      p is either 1 or 2, except that for d=3, p always is 1; and n=a−d·p;
      B) at least one organic polymer selected from the group consisting of modified cellulose derivatives, starch, polyamides, polyesters, polymethacrylates, polyacrylates, polyvinyl alcohol, copolymers of vinyl alcohol with ethylenically unsaturated monomers, polyvinyl acetate, poly(alkylene oxides), vinyl chloride homopolymers, vinyl chloride copolymers, terpolymers of ethylene with carbon monoxide along with an acrylic ester, terpolymers of ethylene with carbon monoxide along with vinyl monomer, polysiloxanes, polyfluoroalkylenes, poly(fluoroalkyl vinyl ethers), homopolymers of halodioxoles, copolymers of halodioxoles, homopolymers of substituted halodioxoles, copolymers of substituted halodioxoles, and poly(vinylpyrrolidone); and
      C) an organic carboxylic acid having a $pK_a$ value of at most 4.0, which organic acid may contain up to about 40 mole % water, and being selected from the group consisting of
         (i) acids miscible with components A) and
         (ii) acids miscible with liquids in which components A) are soluble,
      said acid being present in an amount of at least 2 moles per mole of all components A) present:
      the total amount of water present in the reaction medium being less than that of component C) and, further, such that the mole ratio of water to all components A) present is 0 to 20;
   (2) maintaining the above solution, with agitation as needed, at a temperature of about 0°-100° C. until gelation of the inorganic component occurs; and
   (3) recovering the resulting inorganic-organic interpenetrating network composition.

2. The process of claim 1 wherein component A) is a tetraalkoxysilane.

3. The process of claim 2 wherein the tetraalkoxysilane is tetraethoxysilane.

4. The process of claim 1 wherein component C) is aqueous formic acid containing up to about 4 weight percent of water.

5. The process of claim 4 wherein the aqueous formic acid contains at most about 1 mole percent of water.

6. The process of claim 1 wherein component B) is selected from the group consisting of polyvinyl alcohol, ethylene/vinyl alcohol copolymers, polyamides, and poly(methyl methacrylate).

7. The process of claim 1 wherein step 2) is carried out at about room temperature.

8. The process of claim 1 wherein the amount of water in the reaction medium is such that the mole ratio of water to all components A) present is less than 10.

* * * * *